United States Patent
Zhang et al.

(10) Patent No.: US 12,531,646 B2
(45) Date of Patent: Jan. 20, 2026

(54) COMMUNICATION METHOD AND COMMUNICATION APPARATUS

(71) Applicant: Huawei Technologies Co., Ltd., Shenzhen (CN)

(72) Inventors: Lun Zhang, Dongguan (CN); Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 18/489,075

(22) Filed: Oct. 18, 2023

(65) Prior Publication Data
US 2024/0048262 A1 Feb. 8, 2024

Related U.S. Application Data

(63) Continuation of application No. PCT/CN2022/079416, filed on Mar. 4, 2022.

(30) Foreign Application Priority Data

Apr. 19, 2021 (CN) .................... 202110420777.3

(51) Int. Cl.
H04J 14/00 (2006.01)
H04B 10/278 (2013.01)
H04J 3/16 (2006.01)

(52) U.S. Cl.
CPC .......... H04J 3/1652 (2013.01); H04B 10/278 (2013.01)

(58) Field of Classification Search
CPC .... H04B 10/27; H04B 10/278; H04B 10/272; H04B 10/40; H04Q 11/0067; H04J 14/0245; H04J 14/0246; H04J 14/0278; H04J 14/0228; H04J 14/0239; H04J 14/0249; H04J 14/08; H04J 3/1652
(Continued)

(56) References Cited

U.S. PATENT DOCUMENTS 9,602,212 B2 3/2017 Kuwano et al.
2008/0279554 A1* 11/2008 Kazawa ............ H04Q 11/0067
398/69
(Continued)

FOREIGN PATENT DOCUMENTS

| CN | 112584262 A | 3/2021 |
|---|---|---|
| CN | 113328824 A | 8/2021 |
| EP | 4231660 A1 | 8/2023 |

OTHER PUBLICATIONS

ITU-T G.984.3 Amendment 1 (Mar. 2020), Series G:Transmission Systems and Media, Digital Systems and Networks,Digital sections and digital line system—Optical line systems for local and access networks,total 170 pages.

*Primary Examiner* — Hanh Phan
(74) *Attorney, Agent, or Firm* — Slater Matsil, LLP

(57) ABSTRACT

A communication method and a communication apparatus are provided. The method includes: An optical line terminal (OLT) may obtain a cycle period and a data amount of periodic data, and allocate a first slot and a second slot based on the data amount of the periodic data and the cycle period, where the first slot is used to transmit the periodic data, the second slot is used for windowing, and the second slot is a part or all of slots other than the first slot in the cycle period. The OLT uniformly allocates the first slot used to transmit the periodic data and the second slot used for windowing.

20 Claims, 12 Drawing Sheets

(58) Field of Classification Search
USPC ........ 398/66, 67, 68, 69, 70, 71, 72, 79, 98,
398/99, 100, 135, 136, 158, 159, 33, 38,
398/58, 59, 25, 26, 27; 370/352, 392,
370/389, 468, 465, 395.21, 395.41
See application file for complete search history.

(56) References Cited

U.S. PATENT DOCUMENTS

| | | | |
|---|---|---|---|
| 2010/0215369 A1* | 8/2010 | Effenberger | H04Q 11/0067 398/67 |
| 2017/0257685 A1* | 9/2017 | Siwko | H04J 14/08 |
| 2019/0319866 A1 | 10/2019 | Hirano et al. | |

* cited by examiner

COMMUNICATION METHOD AND COMMUNICATION APPARATUS

CROSS-REFERENCE TO RELATED APPLICATIONS

This application is a continuation of International Application No. PCT/CN2022/079416, filed on Mar. 4, 2022, which claims priority to Chinese Patent Application No. 202110420777.3, filed on Apr. 19, 2021. The disclosures of the aforementioned applications are hereby incorporated by reference in their entireties.

TECHNICAL FIELD

This application relates to the field of communication technologies, and in particular, to a communication method and a communication apparatus.

BACKGROUND

A field bus is an industrial data bus developed rapidly in recent years. The field bus mainly resolves a problem of digital communication between field devices such as an intelligent instrument, a controller, and an actuator in an industrial field and a problem of information transferring between the field control devices and an advanced control system.

Currently, a field bus network has a long running period. For example, at a millisecond (ms) level, the field bus network cannot meet a requirement of a low-delay scenario. The low-delay scenario is, for example, machine vision, motion control, virtual reality (VR), or augmented reality (AR).

In conclusion, how to implement low-delay communication on the field bus is an urgent technical problem that needs to be resolved at present.

SUMMARY

This application provides a communication method and a communication apparatus, to enable an optical terminal to get online and reduce a delay and delay jitter of sending uplink service data by an online optical terminal.

According to a first aspect, this application provides a communication method. The method includes: An optical head-end may obtain a cycle period and a data amount of periodic data, and allocate a first slot and a second slot based on the data amount of the periodic data and the cycle period, where the first slot is used to transmit the periodic data, the second slot is used for windowing, and the second slot is a part or all of slots other than the first slot in the cycle period.

For example, the communication method may be applied to an optical bus network system. The optical bus network system may include an optical head-end, an optical terminal, and an optical distribution network (ODN) that connects the optical head-end and the optical terminal. The optical head-end may be, for example, an optical line terminal (OLT), and the optical terminal may be, for example, an optical network terminal (ONT) or an optical network unit (ONU).

Based on this solution, the optical terminal can get online, and the optical head-end uniformly allocates the first slot used to transmit the periodic data and the second slot used for windowing. In this way, a delay of transmitting service data by an online optical terminal, caused by windowing performed for an off-line optical terminal to get online can be reduced, and delay jitter (or referred to as a delay variation) (for example, less than 1 µs) can be reduced.

In a possible implementation, the second slot is located after the first slot, the second slot is located before the first slot, or the second slot and the first slot are alternately distributed.

When the second slot is located after the first slot, it can be ensured, as much as possible, that the periodic data is preferentially transmitted, to help to reduce a delay of the periodic data.

In a possible implementation, the second slot is less than one frame of a passive optical network (PON) system to which the optical head-end belongs; or the second slot is equal to an integer multiple of one frame of a PON system to which the optical head-end belongs.

It may also be understood as that, the optical head-end may perform windowing with a small slot for the off-line optical terminal, or may perform windowing in an entire frame for the off-line optical terminal. When the second slot is less than one frame of the PON system, the windowing for the off-line optical terminal has little impact on the delay of the periodic data. In this way, the delay of the periodic data can be further reduced.

In a possible implementation, the optical head-end may receive the cycle period and the data amount of the periodic data from a programmable logic controller (PLC).

For example, the optical bus network system may further include the PLC. As a management center of the entire optical bus network system, the PLC may be configured to manage various types of field control devices.

In a possible implementation, the optical head-end obtains an uplink rate of the optical terminal, determines a ratio of the data amount of the periodic data to the uplink rate as a size of the first slot, determines a part or all of the cycle period except for the size of the first slot as a size of the second slot, and determines a location of the first slot and a location of the second slot.

The optical head-end determines the size of the first slot and the size of the second slot, and uniformly arranges the location of the first slot and the location of the second slot, so that delay jitter of the periodic data can be reduced.

In a possible implementation, the optical head-end sends first information to an optical terminal, where the first information is used to notify an off-line optical terminal of the second slot used for windowing.

Further, optionally, the optical head-end receives a serial number (SN) discovery response message or a ranging response message sent by the optical terminal in the second slot.

The off-line optical terminal sends the SN discovery response message or the ranging response message in the second slot, so that normal service data sent by the online optical terminal to the optical head-end is not affected.

In a possible implementation, the windowing includes ranging windowing or SN discovery windowing.

According to a second aspect, this application provides a communication method. The communication method includes: An optical terminal receives first information from an optical head-end, determines a second slot that is in the first information and that is used for windowing, and sends a serial number (SN) discovery response message or a ranging response message to the optical head-end in the second slot. The second slot is a part or all of slots other than a first slot in a cycle period obtained by the optical head-end, the first slot is a slot allocated by the optical head-end to obtained periodic data, and the optical terminal is an off-line optical terminal.

For example, the communication method may be applied to an optical bus network system. The optical bus network system may include an optical head-end, an optical terminal, and an optical distribution network (ODN) that connects the optical head-end and the optical terminal. The optical head-end may be, for example, an optical line terminal (OLT), and the optical terminal may be, for example, an optical network terminal (ONT) or an optical network unit (ONU).

Based on this solution, the off-line optical terminal sends the serial number (SN) discovery response message or the ranging response message in the second slot, so that normal service data sent by an online optical terminal to the optical head-end is not affected.

In a possible implementation, the windowing includes ranging windowing or serial number (SN) discovery windowing.

According to a third aspect, this application provides a communication method. The method includes: A PLC obtains a cycle period and a data amount of periodic data; and the PLC sends the cycle period and the data amount of the periodic data to an optical head-end.

For example, the communication method may be applied to an optical bus network system. The optical bus network system may include an optical head-end, an optical terminal, an optical distribution network (ODN) that connects the optical head-end and the optical terminal, and a PLC. The optical head-end may be, for example, an optical line terminal (OLT), and the optical terminal may be, for example, an optical network terminal (ONT) or an optical network unit (ONU). As a management center of the entire optical bus network system, the PLC may be configured to manage various types of field control devices.

Based on this solution, the PLC sends the cycle period and the data amount of the periodic data to the optical head-end. In this way, the optical head-end can allocate a first slot and a second slot based on the cycle period and the data amount of the periodic data that are sent by the PLC, without waiting for the optical terminal to request authorization. Therefore, a delay of sending the periodic data by the optical terminal is reduced.

According to a fourth aspect, this application provides a communication apparatus. The communication apparatus has a function of implementing the optical head-end in the first aspect, or is configured to implement a function of the optical terminal in the second aspect, or is configured to implement a function of the PLC in the third aspect. The function may be implemented by hardware, or may be implemented by hardware executing corresponding software. The hardware or software includes one or more units or modules corresponding to the foregoing function.

In a possible implementation, the communication apparatus may be the optical head-end, or a module that can be used in the optical head-end, for example, a chip, a chip system, or a circuit. For beneficial effects, refer to the descriptions of the first aspect. Details are not described herein again. The communication apparatus may include a transceiver and a processor. The processor may be configured to support the communication apparatus in performing a corresponding function of the foregoing optical head-end. The transceiver is configured to support communication between the communication apparatus and the optical terminal, the PLC, or the like. The transceiver may be an independent receiver, an independent transmitter, a transceiver integrated with sending and receiving functions, or an interface circuit. Optionally, the communication apparatus may further include a memory. The memory may be coupled to the processor, and the memory stores program instructions and data that are necessary for the communication apparatus.

The transceiver is configured to obtain a cycle period and a data amount of periodic data. The processor is configured to allocate a first slot and a second slot based on the data amount of the periodic data and the cycle period, where the first slot is used to transmit the periodic data, the second slot is used for windowing, and the second slot is a part or all of slots other than the first slot in the cycle period.

In a possible implementation, the second slot is located after the first slot, the second slot is located before the first slot, or the second slot and the first slot are alternately distributed.

In a possible implementation, the second slot is less than one frame of a passive optical network (PON) system to which the communication apparatus belongs; or the second slot is equal to an integer multiple of one frame of a PON system to which the communication apparatus belongs.

In a possible implementation, the transceiver is specifically configured to receive the cycle period and the data amount of the periodic data from a PLC.

In a possible implementation, the transceiver is further configured to send first information to an optical terminal, where the first information is used to notify an off-line optical terminal of the second slot used for windowing.

In a possible implementation, the transceiver is further configured to receive a serial number (SN) discovery response message or a ranging response message sent by the optical terminal in the second slot.

In a possible implementation, the windowing includes ranging windowing or serial number (SN) discovery windowing.

In a possible implementation, the processor is specifically configured to: obtain an uplink rate of the optical terminal, determine a ratio of the data amount of the periodic data to the uplink rate as a size of the first slot, determine a part or all of the cycle period except for the size of the first slot as a size of the second slot, and determine a location of the first slot and a location of the second slot.

In another possible implementation, the communication apparatus may be the optical terminal, or a component that can be used in the optical terminal, for example, a chip, a chip system, or a circuit. For beneficial effects, refer to the descriptions of the second aspect. Details are not described herein again. The communication apparatus may include a transceiver and a processor. The processor may be configured to support the communication apparatus in performing a corresponding function of the foregoing optical terminal. The transceiver is configured to support communication between the communication apparatus and the optical head-end or the like. The transceiver may be an independent receiver, an independent transmitter, a transceiver integrated with sending and receiving functions, or an interface circuit. Optionally, the communication apparatus may further include a memory. The memory may be coupled to the processor, and the memory stores program instructions and data that are necessary for the communication apparatus.

The transceiver is configured to receive first information from an optical head-end. The processor is configured to determine a second slot that is in the first information and that is used for windowing, where the second slot is a part or all of slots other than a first slot in a cycle period obtained by the optical head-end, and the first slot is a slot allocated by the optical head-end to obtained periodic data. The transceiver is further configured to send a serial number (SN) discovery response message or a ranging response message to the optical head-end in the second slot.

In a possible implementation, the windowing includes ranging windowing or serial number (SN) discovery windowing.

In still another possible implementation, the communication apparatus may be the PLC, or a component that can be used in the PLC, for example, a chip, a chip system, or a circuit. For beneficial effects, refer to the descriptions of the third aspect. Details are not described herein again. The communication apparatus may include a transceiver and a processor. The processor may be configured to support the communication apparatus in performing a corresponding function of the foregoing PLC. The transceiver is configured to support communication between the communication apparatus and the optical head-end, the optical terminal, or the like. The transceiver may be an independent receiver, an independent transmitter, a transceiver integrated with sending and receiving functions, or an interface circuit. Optionally, the communication apparatus may further include a memory. The memory may be coupled to the processor, and the memory stores program instructions and data that are necessary for the communication apparatus.

According to a fifth aspect, this application provides a communication apparatus. The communication apparatus is configured to implement the method according to any one of the first aspect or the possible implementations of the first aspect, is configured to implement the method according to any one of the second aspect or the possible implementations of the second aspect, or is configured to implement the method according to any one of the third aspect or the possible implementations of the third aspect. The communication apparatus includes corresponding functional modules, respectively configured to implement steps in the foregoing method. The function may be implemented by hardware, or may be implemented by hardware executing corresponding software. The hardware or software includes one or more modules corresponding to the foregoing function.

In a possible implementation, the communication apparatus may be an optical head-end. The communication apparatus may include a processing module and a transceiver module. The modules may perform corresponding functions of the optical head-end in the foregoing method example. For details, refer to the detailed descriptions in the method example. Details are not described herein again.

In another possible implementation, the communication apparatus may alternatively be an optical terminal. The communication apparatus may include a transceiver module and a processing module. The modules may perform corresponding functions of the optical terminal in the foregoing method example. For details, refer to the detailed descriptions in the method example. Details are not described herein again.

In another possible implementation, the communication apparatus may alternatively be a PLC. The communication apparatus may include a transceiver module and a processing module. The modules may perform corresponding functions of the PLC in the foregoing method example. For details, refer to the detailed descriptions in the method example. Details are not described herein again.

According to a sixth aspect, this application provides a communication system. The communication system includes an optical head-end and an optical terminal. The optical head-end may be configured to perform the method according to any one of the first aspect or the possible implementations of the first aspect. The optical terminal may be configured to perform the method according to any one of the second aspect or the possible implementations of the second aspect.

Further, optionally, the communication system may include a PLC. The PLC may be configured to perform the method according to any one of the third aspect or the possible implementations of the third aspect.

According to a seventh aspect, this application provides a computer-readable storage medium. The computer-readable storage medium stores a computer program or instructions. When the computer program or the instructions are executed by a communication apparatus, the communication apparatus is enabled to perform the method according to any one of the first aspect or the possible implementations of the first aspect, the communication apparatus is enabled to perform the method according to any one of the second aspect or the possible implementations of the second aspect, or the communication apparatus is enabled to perform the method according to any one of the third aspect or the possible implementations of the third aspect.

According to an eighth aspect, this application provides a computer program product. The computer program product includes a computer program or instructions. When the computer program or the instructions are executed by a communication apparatus, the communication apparatus is enabled to perform the method according to any one of the first aspect or the possible implementations of the first aspect, the communication apparatus is enabled to perform the method according to any one of the second aspect or the possible implementations of the second aspect, or the communication apparatus is enabled to perform the method according to any one of the third aspect or the possible implementations of the third aspect.

DETAILED DESCRIPTION OF ILLUSTRATIVE EMBODIMENTS

The following describes embodiments of this application in detail with reference to the accompanying drawings.

Figure 1:
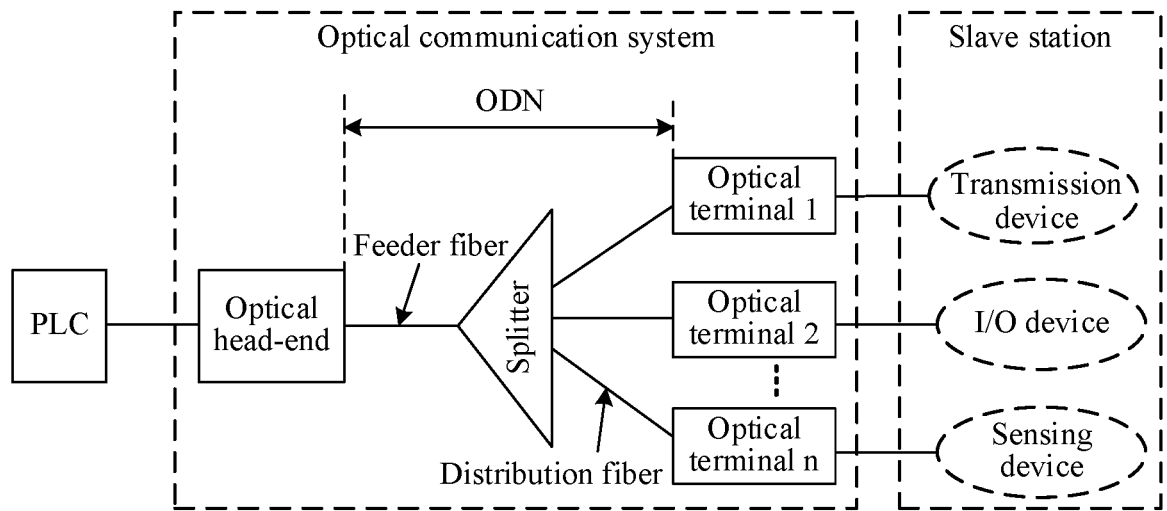
FIG. 1 is a schematic architectural diagram of an optical bus network system to which this application can be applied.

FIG. 1 is a schematic architectural diagram of an optical bus network system to which this application can be applied. The optical bus network system may include a controller and an optical communication system. The optical communication system includes at least an optical head-end, an optical distribution network (ODN), and optical terminals. The optical head-end is connected to the optical terminals by using the ODN. The ODN includes a feeder fiber, a splitter, and distribution fibers. An example in which the optical communication system includes n optical terminals is used in FIG. 1. The n optical terminals are respectively an optical terminal 1, an optical terminal 2, . . . , and an optical terminal n. The splitter may also be referred to as an optical splitter, may be a fiber convergence component having a plurality of input ends and a plurality of output ends, and is configured to couple and allocate optical signals. The optical head-end is connected to the splitter through the feeder fiber. The splitter is connected to the optical terminal through the distribution fiber. Further, optionally, the optical bus network system may include a field control device (or a conventional industrial device), for example, a transmission device (for example, a servo driver and a servo motor), a sensing device (for example, a sensor), or an input/output (I/O) device. It should be understood that the field control devices may be collectively referred to as a slave station. The controller may be, for example, a programmable logic controller (PLC). As a management center of the entire optical bus network system, the PLC may be configured to manage various types of field control devices. Further, optionally, the optical bus network system may include a device accessing an ethernet/internet protocol (IP) internet. It should be noted that, the foregoing optical bus network system may be used for a field bus.

It should be noted that, forms and a quantity of structures in the optical bus network system shown in FIG. 1 are merely examples, and constitute no limitation on this application. Quantities of optical head-ends, optical terminals, splitters, and ports included in the splitters in the optical communication system in FIG. 1 are merely an example. This is not limited in this application. The optical head-end may be, for example, an optical line terminal (OLT), in other words, the OLT may implement a function of the optical head-end. The optical terminal may be, for example, an optical network terminal (ONT) or an optical network unit (ONU), in other words, the ONT or the ONU may implement a function of the optical terminal. In addition, names of the structures in the optical bus network system shown in FIG. 1 are merely an example, and the structures may alternatively have other names in specific implementation. This is not specifically limited in this application.

It should be further noted that, the optical head-end and the PLC may be deployed separately, or may be deployed in an integrated manner. In other words, the optical head-end and the PLC may be deployed in different physical devices, or may be deployed in a same physical device. To be specific, the optical head-end and the PLC may be two independent physical devices, or may be two functional modules in a same physical device. In addition, the optical terminal and the slave station may be deployed separately, or may be deployed in an integrated manner. In other words, the optical terminal and the slave station are different independent physical devices, or the optical terminal and the slave station may be an integrated device. This is not limited in this application.

Herein, the optical communication system may be a passive optical network (PON) system. The PON system may be, for example, a gigabit-capable passive optical network (GPON) system, an ethernet passive optical network (EPON) system, a 10 Gb/s ethernet passive optical network (10G-EPON) system, a time and wavelength division multiplexing passive optical network (TWDM-PON) system, a 10-gigabit-capable passive optical network (XG-PON) system, or a 10-gigabit-capable symmetric passive optical network (XGS-PON) system. With emergence of a future evolved new technology, a rate of the PON system may be increased to 25 Gbps, 50 Gbps, or even 100 Gbps. Therefore, the optical communication system may alternatively be a PON system with a higher transmission rate. This is not limited in this application.

In a possible implementation, the PON system may be a PON system that supports a single wavelength.

It should be noted that, a system architecture described in this application is intended to describe the technical solutions in this application more clearly, but does not constitute a limitation on the technical solutions provided in this application. A person of ordinary skill in the art may know that with evolution of the system architecture and emergence of a new service scenario, the technical solutions provided in this application are also applicable to the following similar technical problems.

For ease of description, an example in which an optical head-end is an OLT and an optical terminal is an ONT is used in the following in this application. In other words, in the following descriptions of this application, the OLT may be replaced with the optical head-end, and the ONT may be replaced with the optical terminal.

For example, a PON system mainly includes an OLT, a plurality of ONTs, and an ODN that connects the OLT and the ONTs. The OLT is a central office device of telecommunications, and is located at a central office in a PON system. The ONT is a termination unit of the PON network and is also referred to as an "optical modem". The ODN provides an optical signal transmission channel between the OLT and the ONT. The ODN does not include any electronic component or electronic power supply. The ODN mainly includes passive components such as a splitter and a fiber, and does not require an active electronic device.

Based on FIG. 1, a transmission direction in which data or an optical signal carrying data is transmitted from the OLT to the ONT is referred to as a downlink direction. A direction in which data or an optical signal carrying data is transmitted from the ONT to the OLT is referred to as an uplink direction. The OLT may transmit the optical signal to the ONT in a broadcast manner, and the ONT may transmit the optical signal to the OLT in a unicast manner. It should be understood that, in the uplink direction, the PON system is a multi-point to point (MP2P) system. In the downlink direction, the PON system is a point to multi-point (P2MP) system.

Figure 2:
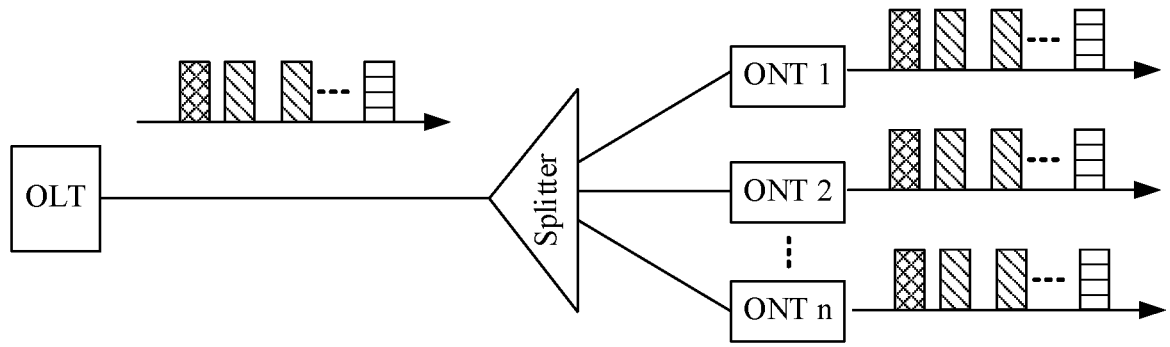
FIG. 2 is a schematic diagram of downlink transmission according to this application.
Figure 3:
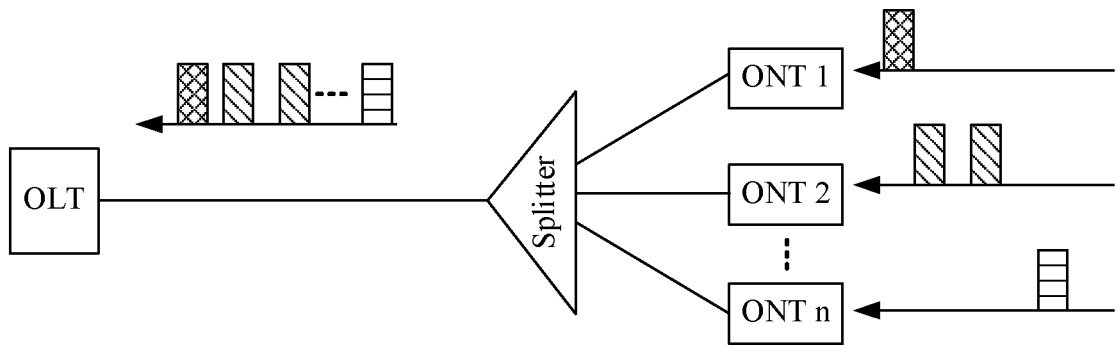
FIG. 3 is a schematic diagram of uplink transmission according to this application.

Generally, a time division multiplexing technology, for example, time division multiple access (TDMA), is used to transmit the data between the OLT and the ONT. During downlink transmission, refer to FIG. 2. When the OLT sends downlink data to the ONT, after passing through a splitter, one channel of optical signals sent by the OLT are divided into n channels and respectively sent to n ONTs. Each ONT selectively receives downlink data with a same number as that of the ONT, and discards other data. During uplink transmission, refer to FIG. 3. Each dynamical bandwidth assignment (DBA) period (uplink transmission duration, namely, one or more frames of the PON system) is divided into a plurality slots Ti (i=1, 2, 3, . . . ). In each slot, only one ONT is arranged to send uplink data to the OLT, and all ONTs sequentially send uplink data according to a sequence specified by the OLT. It should be understood that one or more slots may be allocated to one ONT. FIG. 3 is merely a possible example.

During uplink transmission, each ONT can send uplink data only when a slot of the ONT arrives, and needs to turn off a transmitter in other time. Otherwise, when the plurality of ONTs simultaneously transmit uplink data, collision or interference is caused. Consequently, the OLT cannot receive the uplink data sent by the ONTs, and a service of an entire optical communication system is interrupted. When the foregoing situation occurs, an ONT that randomly sends an optical signal and that is not in a slot of the ONT is referred as to a rogue ONT. To ensure normal running of the optical communication system, the OLT strictly allocates a slot in which each ONT is located to avoid the rogue ONT.

Figure 4:
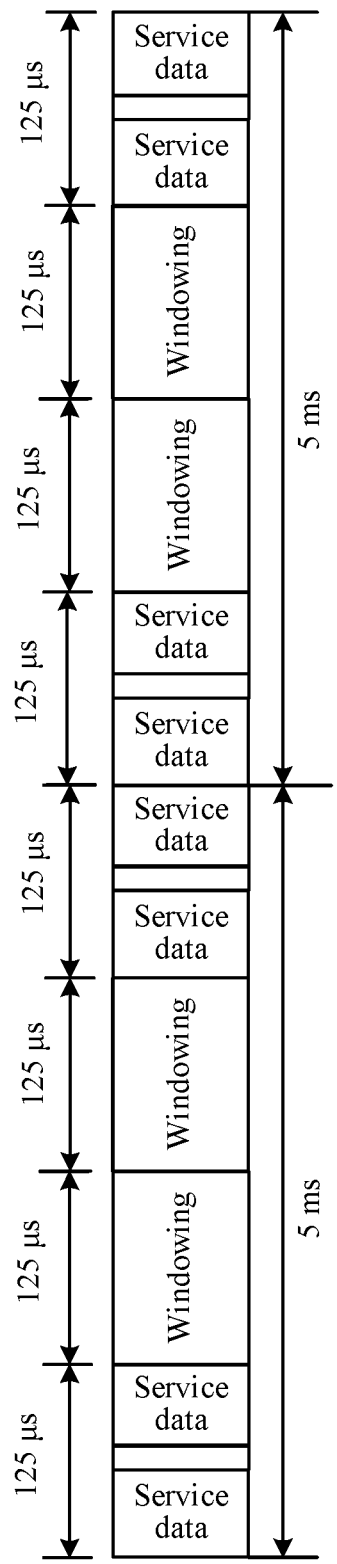
FIG. 4 is a schematic diagram of an uplink windowing manner in a conventional technology.

It should be understood that, before each ONT establishes a controllable connection to the OLT and transmits data, the ONT needs to be first registered (or referred to as getting online). In an ONT registration phase, the OLT may obtain information about a distance between the ONT and the OLT, and allocate an uplink slot to the ONT based on the information about the distance between the OLT and the ONT, to avoid collision of uplink service data of each ONT as much as possible. When a new ONT needs to be registered (or referred to as getting online), currently, an uplink windowing manner is used to avoid, as much as possible, impact caused by information sent by the new ONT in a registration phase on uplink data of an online ONT. Uplink windowing means that the OLT periodically does not allow all online ONTs to send uplink service data. In the uplink direction, an empty window state is presented, and only an unregistered ONT is allowed to send registration information (including information used for ranging) in an empty window period. As shown in FIG. 4, an uplink windowing manner in a conventional technology is provided. To be specific, windowing is performed every 5 ms, and a size of each time of windowing is two frames. During the windowing, all online ONTs are not allowed to send uplink data, that is, an empty window state is presented in the uplink direction. Therefore, a registered ONT cannot send uplink data during the windowing. Consequently, a delay of sending the uplink data by the registered ONT is large and the delay is uncertain. When the foregoing optical communication system is applied to a scenario with a strict requirement on a delay, for example, a radio bearer, virtual reality (VR), or augmented reality (AR), the uplink windowing manner in the conventional technology cannot meet requirements of the scenarios with strict requirements on the delay.

In view of the foregoing problem, this application provides a communication method. In the method, a delay of periodic data (where for details, refer to the following related descriptions) transmitted by an online ONT can be reduced, and determination of delay jitter can be ensured as much as possible. The method may be applied to the optical bus network system shown in FIG. 1. In the method, an OLT may be the optical head-end in FIG. 1, and an ONT may be the optical terminal in FIG. 1.

Figure 5:
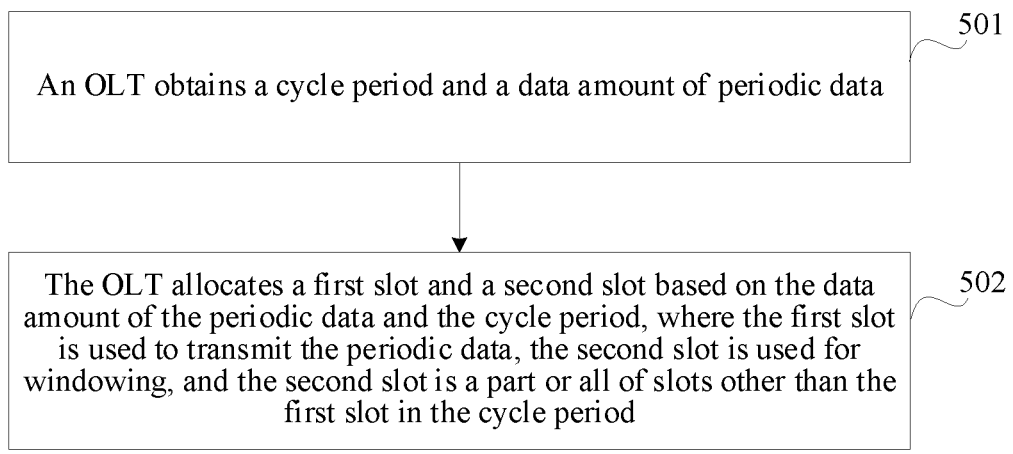
FIG. 5 is a schematic flowchart of a communication method according to this application.

FIG. 5 is a schematic flowchart of a communication method according to this application. The method includes the following steps.

Step 501: An OLT obtains a cycle period and a data amount of periodic data.

Figure 6:
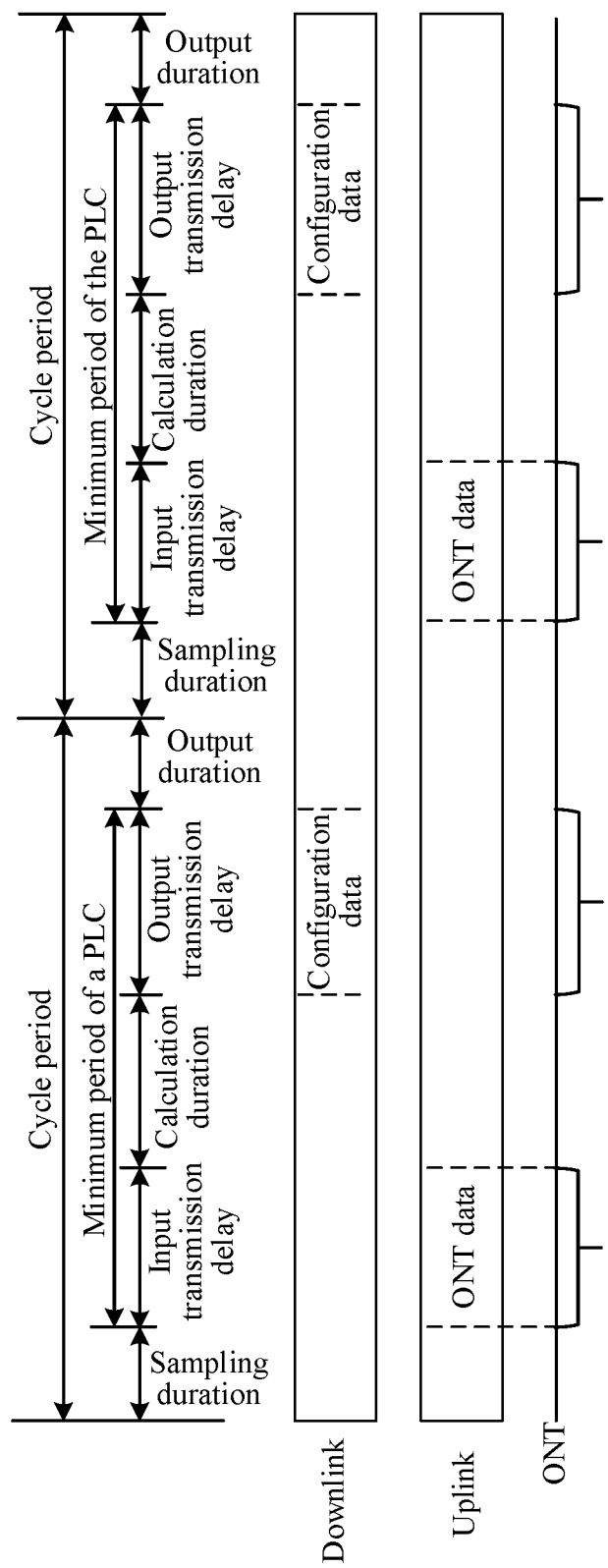
FIG. 6 is a schematic diagram of a structure of a cycle period according to this application.

Herein, the cycle period refers to a cycle period of a PLC. The cycle period includes a sum of duration in which a slave station performs sampling (for example, collecting a speed, a location, and a current of an industrial control device), an input transmission delay of transmitting sampled data to the PLC, duration (which may be referred to as calculation duration) in which the PLC performs calculation based on the sampled data, an output transmission delay of transmitting a calculation result (or referred to as configuration data or downlink data) to the slave station by the PLC, and duration in which the slave station outputs the received calculation result. Refer to FIG. 6. It may also be understood that, the cycle period refers to duration required for performing the cycle operations shown in FIG. 6 for one time. The cycle period may also be referred to as cycle time or scanning cycle time. For example, the cycle period may be preconfigured by the PLC.

The periodic data may be, for example, a process data object (PDO). The PDO is used to transfer a real-time control parameter or variable of each device of the slave station, and exchange of the PDO is periodically transferred. Generally, the periodic data has a high requirement on a delay.

It should be noted that, the data amount of the periodic data is fixed. For example, with reference to FIG. 1, a data amount of periodic data of a transmission device (which may be referred to as a slave station 1) is 1000 bytes, and a data amount of periodic data of a sensing device (which may be referred to as a slave station 2) is 2000 bytes.

In a possible implementation, the OLT may obtain the cycle period and the data amount of the periodic data in the following three possible manners.

Manner 1: The OLT receives the cycle period and the data amount of the periodic data from the PLC.

Based on the manner 1, the PLC may preconfigure the cycle period, and receive the periodic data reported by the slave station. With reference to FIG. 6, ONT data includes periodic data, and may further include aperiodic data. Correspondingly, the PLC may determine the data amount of the received periodic data. Further, the PLC sends the cycle period and the data amount of the periodic data to the OLT.

Based on the manner 1, the PLC sends the cycle period and the data amount of the periodic data to an optical head-end. In this way, the optical head-end can allocate a first slot and a second slot based on the cycle period and the data amount of the periodic data that are sent by the PLC, without waiting for an optical terminal to request authorization. Therefore, a delay of sending the periodic data by the optical terminal is reduced.

Manner 2: The OLT receives the cycle period from the PLC and receives the periodic data from the slave station.

Based on the manner 2, the PLC may preconfigure the cycle period, and send the cycle period to the OLT. The OLT may receive the periodic data from the slave station and determine the data amount of the periodic data.

Manner 3: The cycle period and the data amount of the periodic data are directly injected into the OLT.

For example, the cycle period and the data amount of the periodic data may be written into a memory area of the OLT through a serial peripheral interface (SPI).

Step 502: The OLT allocates the first slot and the second slot based on the data amount of the periodic data and the cycle period.

The first slot is used to transmit the periodic data, the second slot is used for windowing, and the second slot is a part or all of slots other than the first slot in the cycle period. It should be understood that, the second slot is a window size of the windowing.

It should be noted that, the allocating the first slot includes allocating a size of the first slot (or referred to as a length of the first slot) and a location of the first slot. The allocating the second slot includes allocating a size of the second slot (or referred to as a length of the second slot) and a location of the second slot.

In a possible implementation, the OLT may obtain an uplink rate of an ONT, determine a ratio of the data amount of the periodic data to the uplink rate as the size of the first slot, determine a part or all of the cycle period except for the size of the first slot as the size of the second slot, and uniformly determine the location of the first slot and the location of the second slot.

It should be noted that, the uplink rate of the ONT is an uplink rate of a PON system to which the ONT and the OLT belong. For example, if the ONT belongs to a GPON system, the uplink rate is 1.25 Gbps. If the ONT belongs to an XG-PON system, the uplink rate is 2.5 Gbps. If the ONT belongs to an XGS-PON system, the uplink rate is 9.95 Gbps.

For example, if the cycle period is 31.25 μs, the data amount of the periodic data is 1000 bytes, and the uplink rate is 1.25 Gbps, the size of the first slot is equal to 1000 bytes/1.25 Gbps=6.25 μs, and the size of the second slot may fall within a range of 31.25−6.25=25 μs. To be specific, the size of the second slot may be equal to 25 μs, or may be greater than 0 and less than 25 μs.

Based on the foregoing step 501 and step 502, the optical terminal can get online, and the optical head-end uniformly allocates the first slot used to transmit the periodic data and the second slot used for windowing. In this way, a delay, of transmitting service data by an online optical terminal, caused by windowing performed for an off-line optical terminal to get online can be reduced, and delay jitter (or referred to as a delay variation) (for example, less than 1 μs) can be reduced.

In the following, for example, two possible relationships between the first slot, the second slot, and the cycle period are shown.

Relationship 1: The second slot is a part of slots other than the first slot in the cycle period.

Figure 7A:
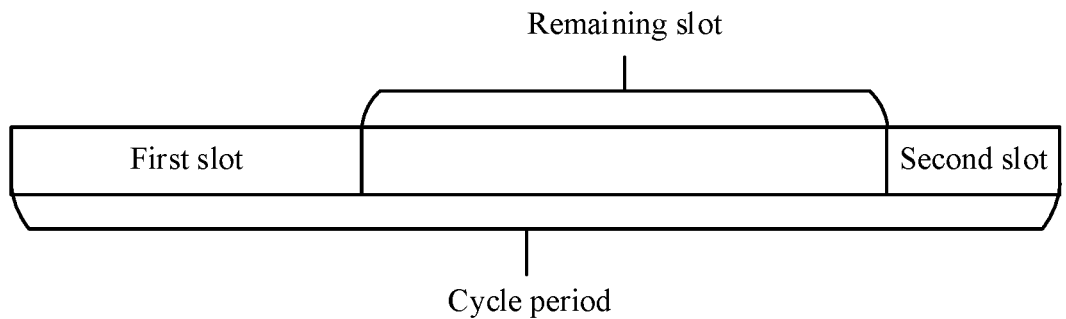
FIG. 7a is a schematic diagram of a relationship between a first slot, a second slot, and a cycle period according to this application.

As shown in FIG. 7*a*, the second slot is the part of slots other than the first slot in the cycle period. To be specific, in one cycle period, besides the first slot used to transmit the periodic data and the second slot used for windowing, there are still a part of remaining slots. The part of remaining slots may be used to transmit temporarily generated common data (for example, data generated when the slave station temporarily reports an alarm status or when the slave station is a camera).

Relationship 2: The second slot is all of slots other than the first slot in the cycle period.

Figure 7B:
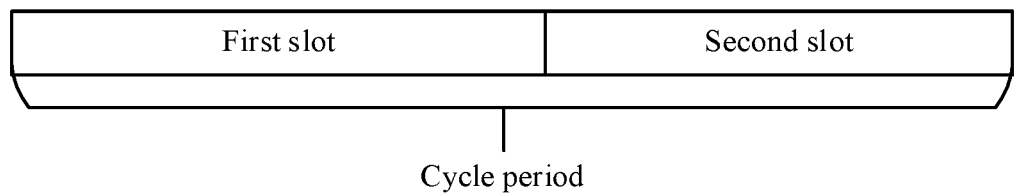
FIG. 7b is a schematic diagram of another relationship between a first slot, a second slot, and a cycle period according to this application.

As shown in FIG. 7*b*, the second slot is all of the slots other than the first slot in the cycle period. In other words, one cycle period includes the first slot used to transmit the periodic data and the second slot used for windowing.

It should be understood that, the second slot used for windowing does not need to be allocated to each cycle period. If the cycle period, the first slot, and the second slot meet the foregoing relationship 2, the temporarily generated common data may be transmitted in a cycle period to which the second slot used for windowing is not allocated.

In a possible implementation, the cycle period is equal to one frame that is of the PON system and that is divided by N, where N is a positive integer. For example, one frame of the PON system is equal to 125 μs. Alternatively, the cycle period is equal to one frame that is of the PON system and that is multiplied by N, where N is a positive integer. For example, the cycle period is equal to 125 μs/N, or the cycle period is equal to 125 μs×N.

For ease of solution description, the following uses N=1 as an example. To be specific, the cycle period is equal to one frame of the PON system.

It should be noted that, to avoid, as much as possible, mutual interference between periodic data transmitted between different ONUs, there may be a gap before the first slot allocated to each ONU. Further, optionally, there is also a GAP before an allocated third slot.

Figure 8A:
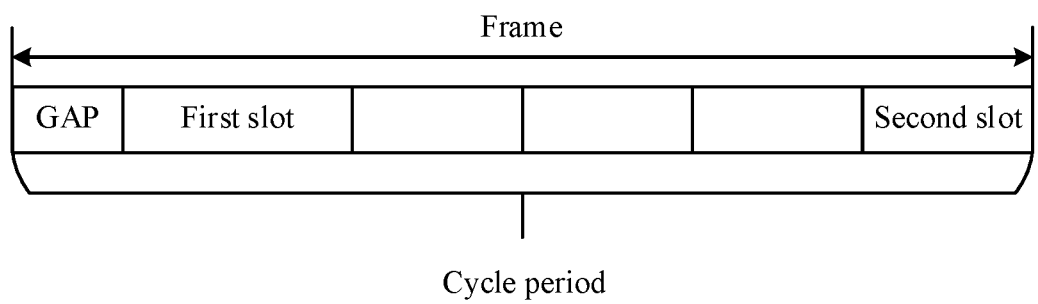
FIG. 8a is a schematic diagram of a relationship between a first slot, a second slot, and a frame according to this application.

Refer to FIG. 8*a*. The second slot is less than one frame of the PON system to which the OLT belongs. It may also be understood as that, the OLT performs windowing with a small slot. In other words, the size of the second slot is less than a size of one frame of the PON system. When one frame of the PON system is equal to 125 μs, the second slot is less than 125 μs. For example, the OLT determines that a part of slots (the second slot) in an $i^{th}$ frame are used for windowing.

Figure 8B:
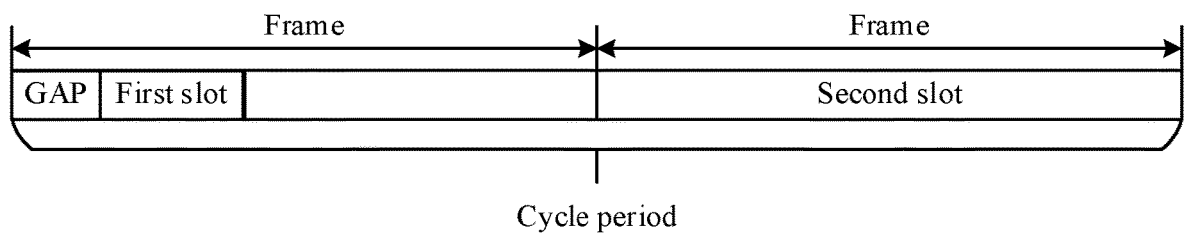
FIG. 8b is a schematic diagram of another relationship between a first slot, a second slot, and a frame according to this application.

Refer to FIG. 8*b*. The second slot is equal to an integer multiple of one frame of the PON system to which the OLT belongs. It may also be understood as that, the OLT performs windowing in an entire frame. In other words, the size of the second slot is equal to an integer multiple of a size of one frame of the PON system. It should be noted that, the second slot may be one frame of the PON system, or may be a plurality of consecutive frames of the PON system. When one frame of the PON system is equal to 125 μs, the second slot is equal to an integer multiple of 125 μs. For example, the OLT may determine that a $j^{th}$ frame and a $(j+1)^{th}$ frame are used for windowing.

Figure 9A:
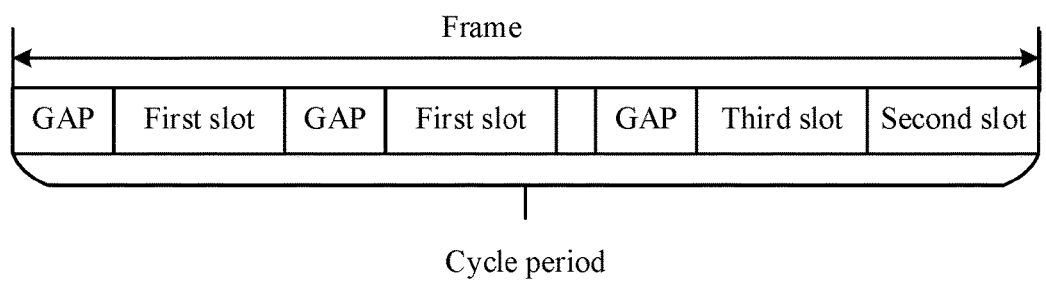
FIG. 9a is a schematic diagram of a relationship between a first slot, a second slot, a third slot, and a cycle period according to this application.
Figure 9B:
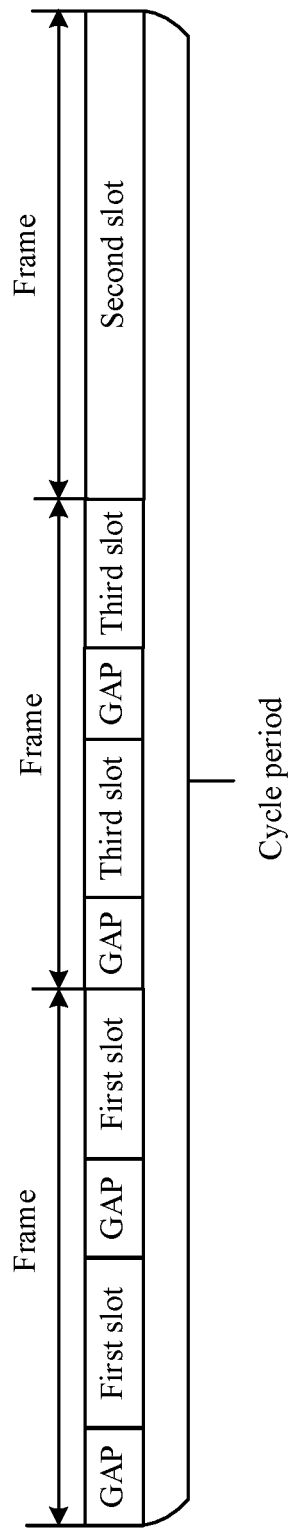
FIG. 9b is a schematic diagram of another relationship between a first slot, a second slot, a third slot, and a cycle period according to this application.

Further, optionally, some temporary common data (or referred to as aperiodic data), for example, a service data object (SDO), may also be transmitted in the PON system. The aperiodic data may be transmitted in the third slot other than the first slot and the second slot in the cycle period. Refer to FIG. 9*a* and FIG. 9*b*.

It should be noted that, in FIG. 9*a* and FIG. 9*b*, two off-line ONTs are used as an example. To be specific, descriptions are provided by using an example in which the OLT respectively allocates first slots to the two ONTs, and lengths of the first slots allocated to the two ONTs are the same. It should be understood that, a first slot allocated by the OLT to each ONT is related to the data amount of the periodic data reported by the ONT. FIG. 9*a* and FIG. 9*b* are merely examples.

Figure 10A:
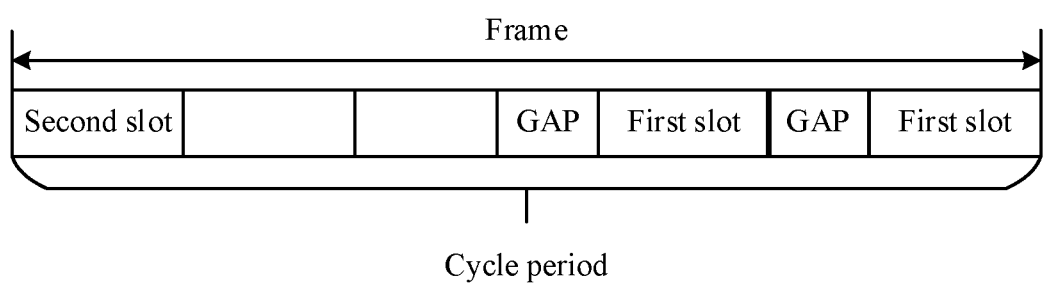
FIG. 10a is a schematic diagram of a location relationship between a first slot and a second slot according to this application.
Figure 10B:
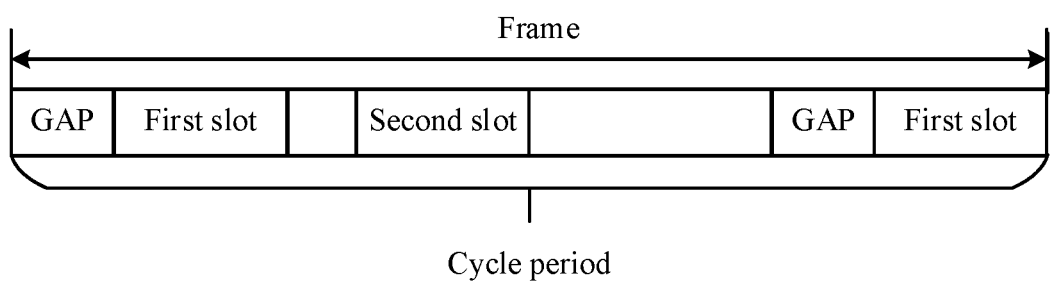
FIG. 10b is a schematic diagram of another location relationship between a first slot and a second slot according to this application.

In a possible implementation, the second slot may be located after the first slot (refer to FIG. 7a, FIG. 7b, FIG. 8a, FIG. 8b, FIG. 9a, or FIG. 9b), the second slot may be located before the first slot (refer to FIG. 10a), or the second slot and the first slot are alternately distributed (refer to FIG. 10b).

In a possible implementation, the OLT may further send first information to an off-line ONT, where the first information is used to notify the off-line ONT of the second slot used for windowing. Correspondingly, the off-line ONT may send an SN discovery response message or a ranging response message to the OLT in the second slot. Further, optionally, the first information may be a bandwidth map (BWMAP).

In a possible implementation, the windowing may include SN discovery windowing and ranging windowing. The SN discovery windowing is windowing corresponding to an SN discovery phase in an ONT registration process. The ranging windowing is windowing corresponding to a ranging phase in the ONT registration process.

Figure 11:
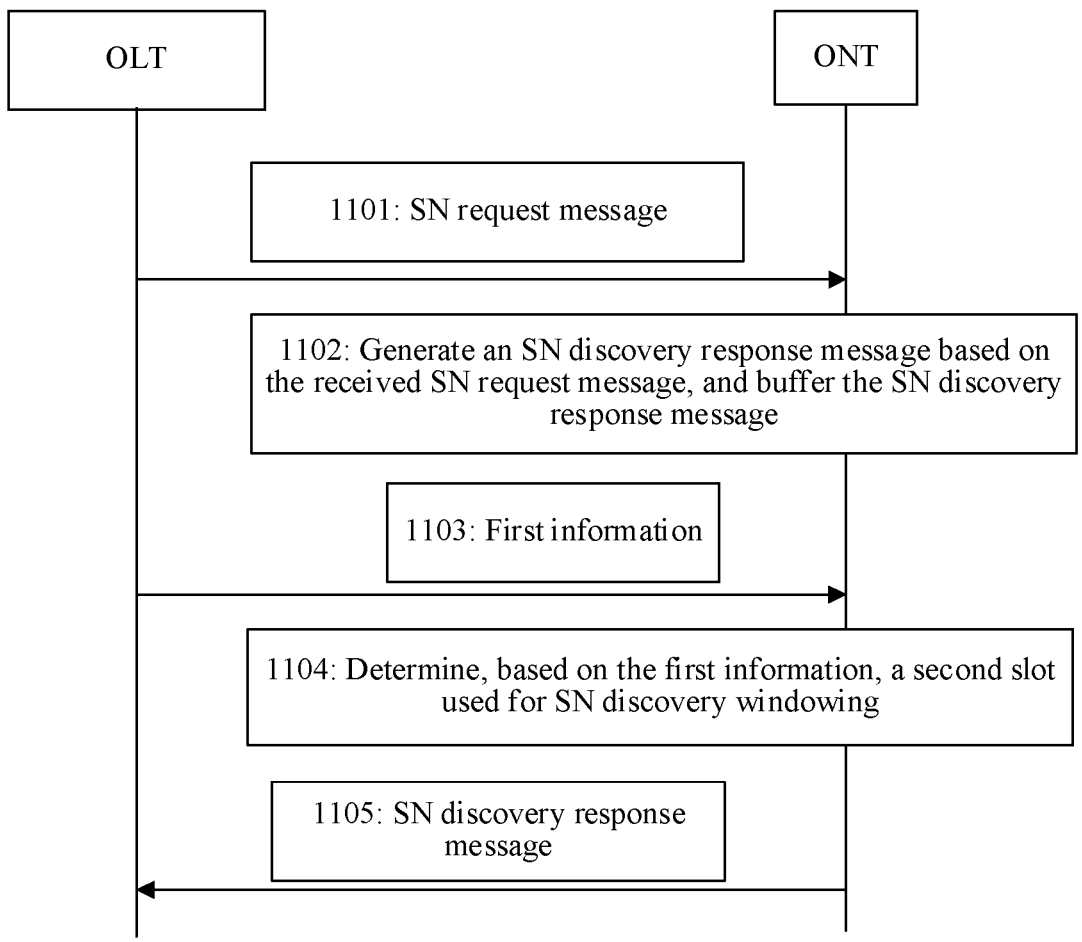
FIG. 11 is a schematic flowchart of a method in an SN discovery phase according to this application.

FIG. 11 is a schematic flowchart of a method in an SN discovery phase according to this application. The method may include the following steps.

Step 1101: An OLT broadcasts an SN request message. Correspondingly, an off-line ONT receives the SN request message broadcast by the OLT.

Step 1102: The off-line ONT generates an SN discovery response message based on the received SN request message, and buffers the SN discovery response message.

Step 1103: The OLT sends first information to the off-line ONT. Correspondingly, the off-line ONT receives the first information from the OLT.

Herein, the first information is used to notify the off-line ONT of a second slot used for SN discovery windowing.

Step 1104: The off-line ONT determines, based on the first information, the second slot used for SN discovery windowing.

Step 1105: The off-line ONT sends the SN discovery response message to the OLT in the second slot. Correspondingly, the OLT receives the SN discovery response message from the off-line ONT in the second slot.

With reference to FIG. 8a, the OLT may not allocate a BWMAP in a second slot in an $i^{th}$ frame, and may broadcast the BWMAP in an $(i+1)^{th}$ frame, where an alloc-identifier (ID) included in the BWMAP is a broadcast identifier (ID), and start time corresponds to start time of the second slot in the $i^{th}$ frame. The OLT broadcasts the SN request message in the $(i+1)^{th}$ frame.

With reference to FIG. 8b, the OLT does not allocate a BWMAP in a $j^{th}$ frame; delivers the BWMAP in a $(j+1)^{th}$ frame, where an alloc-ID included in the BWMAP is a broadcast ID; and delivers the SN request message in the $(j+1)^{th}$ frame.

It can be learned from the foregoing step 1101 to step 1105 that, the off-line ONT that sends the SN discovery response message in the second slot, so that it can be ensured that the SN discovery response message does not affect normal service data sent by an online ONT to the OLT.

Figure 12:
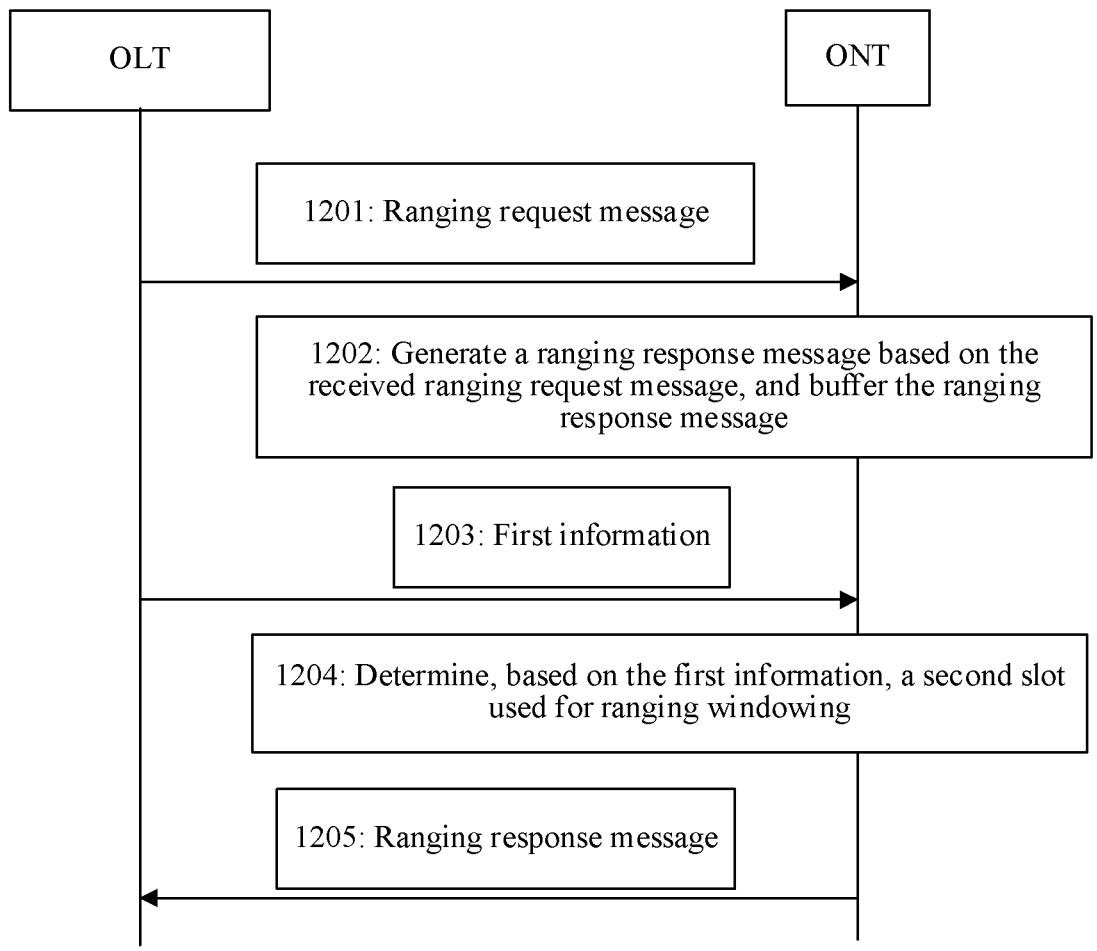
FIG. 12 is a schematic flowchart of a method in a ranging phase according to this application.

FIG. 12 is a schematic flowchart of a method in a ranging phase according to this application. The method may include the following steps.

Step 1201: An OLT sends a ranging request message to an off-line ONT. Correspondingly, the off-line ONT receives the ranging request message from the OLT.

Step 1202: The off-line ONT generates a ranging response message based on the received ranging request message, and buffers the ranging response message.

Step 1203: The OLT sends first information to the off-line ONT. Correspondingly, the off-line ONT receives the first information from the OLT.

Herein, the first information is used to notify the off-line ONT of a second slot used for ranging windowing.

Step 1204: The off-line ONT determines, based on the first information, the second slot used for ranging windowing.

Step 1205: The off-line ONT sends the ranging response message to the OLT in the second slot. Correspondingly, the OLT receives the ranging response message from the off-line ONT in the second slot.

It can be learned from the foregoing step 1201 to step 1205 that, the off-line ONT sends the ranging response message in the second slot, so that it can be ensured that the ranging response message does not affect normal service data sent by an online ONT to the OLT.

In a possible implementation, an ONT registration process further includes an authentication phase. Authentication is to allow a specific ONT to get online from a perspective of an operator. Therefore, authentication management needs to be performed on the ONT, so that a user does not access an incorrect ONT. In the authentication phase, after entering an operating state, the OLT sends a password (PWD) request to an ONT and compares a PWD returned by the ONT with a locally configured PWD. If the PWD returned by the ONT is the same as the locally configured PWD, the ONT is allowed to get online, and an ONT getting online alarm is reported to a host command line or a network management system. If the PWD returned by the ONT is different from the locally configured PWD, a PWD error alarm is reported to a host command line or a network management system.

After the authentication succeeds, the ONT enters a running phase.

In the running phase of the ONT, the OLT allocates a default ONT management and control interface (OMCI) bandwidth to the ONT, where the OMCI bandwidth may be used for communication between the ONT and the OLT.

Figure 13:
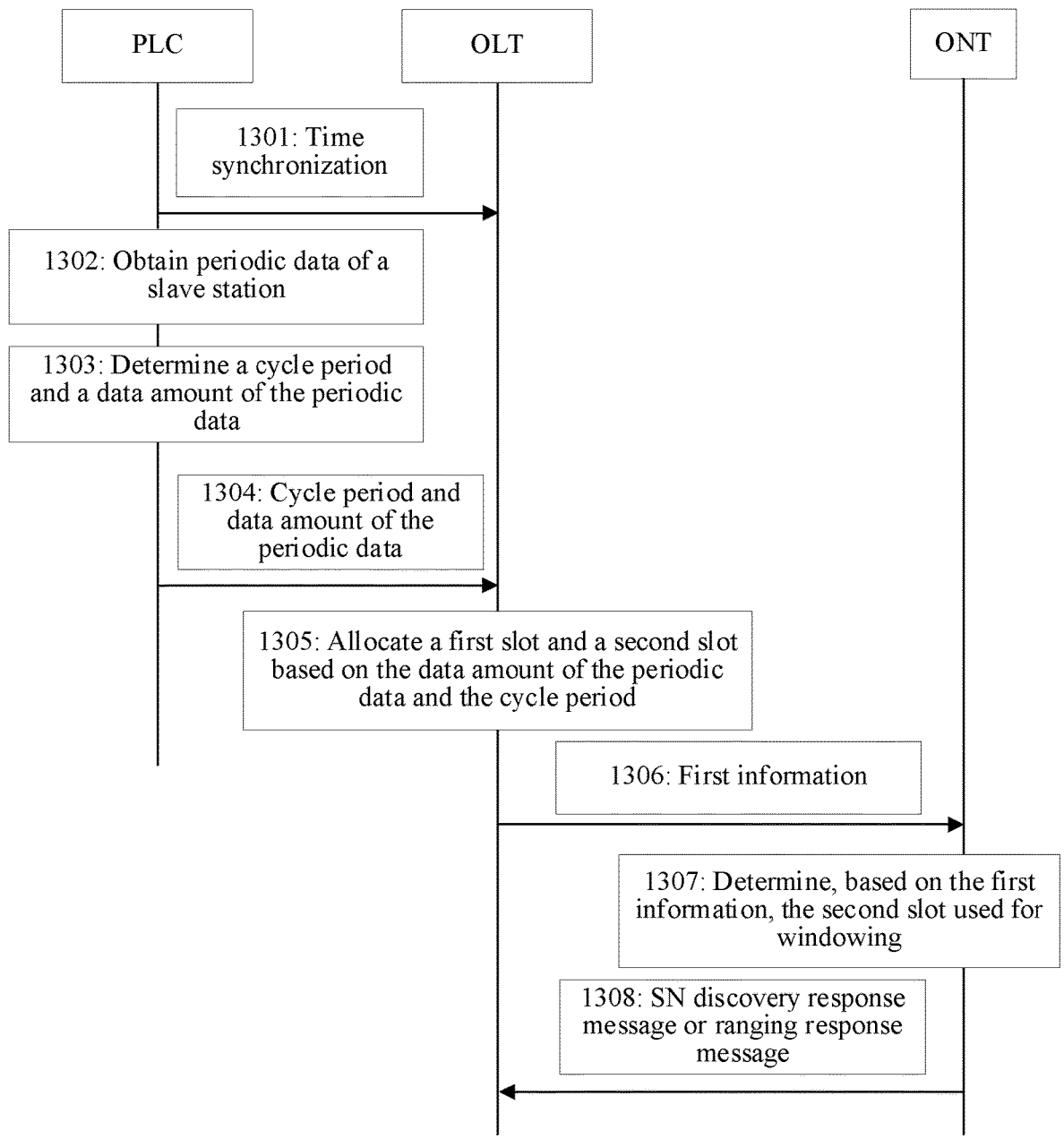
FIG. 13 is a schematic flowchart of another communication method according to this application.

Based on the foregoing content, FIG. 13 is a schematic flowchart of another communication method according to this application. The communication method may be applied to the optical bus network system shown in FIG. 1. The method may include the following steps.

Step 1301: A PLC performs time synchronization with an OLT.

Step 1302: The PLC obtains periodic data of a slave station.

Herein, the PLC may parse a configuration file (for example, an extensible markup language (XML) file) of the slave station to obtain the periodic data of the slave station. The configuration file of the slave station includes each configuration parameter and size of the slave station. Alternatively, the slave station may report the periodic data of the slave station to the PLC by using an uplink OMCI message.

Step 1303: The PLC determines a cycle period and a data amount of the periodic data.

For step 1303, refer to the related descriptions of step 501. Details are not described herein again.

Step 1304: The PLC sends the cycle period and the data amount of the periodic data to the OLT.

Herein, the PLC may send the cycle period and the data amount of the periodic data to the OLT through a management channel between the PLC and the OLT.

Step 1305: The OLT allocates a first slot and a second slot based on the data amount of the periodic data.

For step 1305, refer to the related descriptions of step 502. Details are not described herein again.

Step 1306: The OLT sends first information to each off-line ONT.

Herein, the first information is used to notify the off-line ONT of the second slot used for windowing.

Step 1307: The ONT determines, based on the received first information, the second slot used for windowing.

Step 1308: The ONT sends an SN discovery response message or a ranging response message to the OLT in the second slot.

It may be understood that, to implement the functions in the foregoing embodiments, an optical head-end and an optical terminal each include a corresponding hardware structure and/or a corresponding software module for performing each function. A person skilled in the art should be easily aware that, based on the modules and the method steps in the examples described in embodiments disclosed in this application, this application can be implemented by hardware or a combination of hardware and computer software. Whether a function is performed by hardware or hardware driven by computer software depends on a particular application scenario and a design constraint of the technical solutions.

Figure 14:
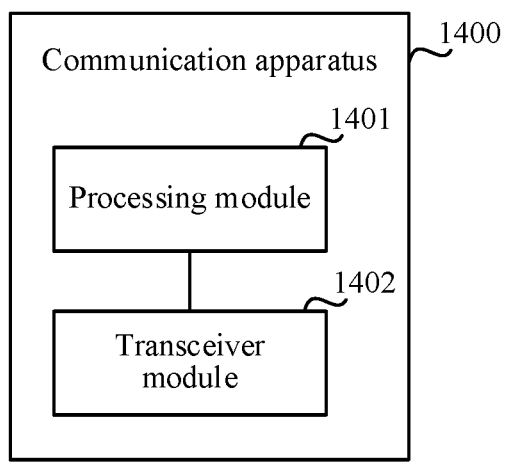
FIG. 14 is a schematic diagram of a structure of a communication apparatus according to this application.
Figure 15:
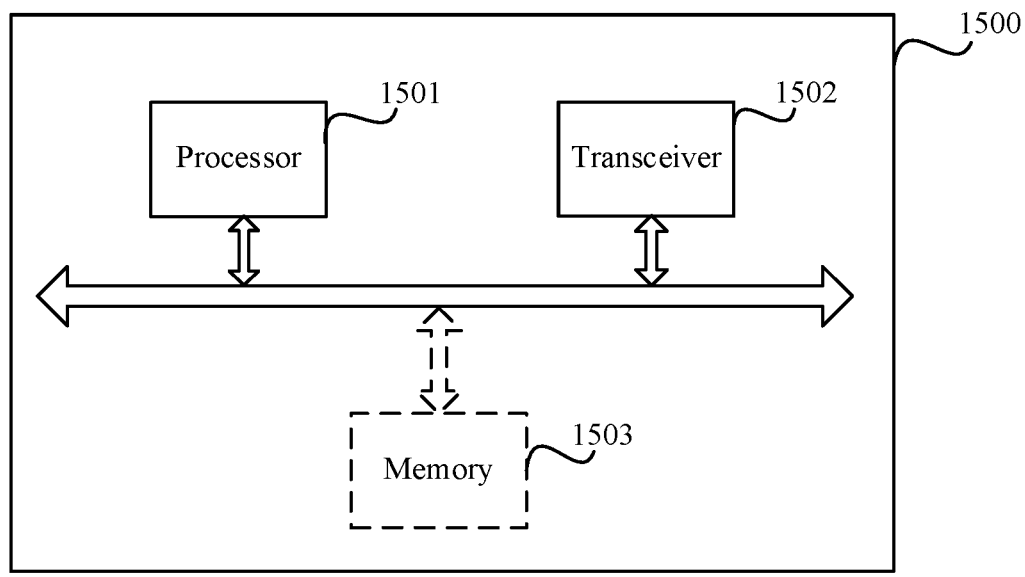
FIG. 15 is a schematic diagram of a structure of a communication apparatus according to this application.

Based on the foregoing content and a same concept, FIG. 14 and FIG. 15 are schematic diagrams of structures of possible communication apparatuses according to this application. The communication apparatuses may be configured to implement a function of the optical head-end or the optical terminal in the foregoing method embodiments, and therefore can also implement beneficial effects of the foregoing method embodiments. In this application, the communication apparatus may be the OLT or the ONT shown in FIG. 1, or may be a module (for example, a chip) used in the optical head-end or the optical terminal.

As shown in FIG. 14, the communication apparatus 1400 includes a processing module 1401 and a transceiver module 1402. The communication apparatus 1400 is configured to implement a function of the optical head-end or the optical terminal in the method embodiments shown in FIG. 5, FIG. 11, and FIG. 12.

When the communication apparatus 1400 is configured to implement the function of the optical head-end in the method embodiment shown in FIG. 5, the processing module 1401 is configured to obtain a cycle period and a data amount of periodic data. The transceiver module 1402 is configured to allocate a first slot and a second slot based on the data amount of the periodic data, where the first slot is used to transmit the periodic data, the second slot is used for windowing, and the second slot is a part or all of slots other than the first slot in the cycle period.

When the communication apparatus 1400 is configured to implement the function of the optical terminal in the method embodiment shown in FIG. 5, the transceiver module 1402 is configured to receive first information from an optical head-end. The processing module 1401 is configured to determine a second slot that is in the first information and that is used for windowing, where the second slot is a part or all of slots other than a first slot in a cycle period obtained by the optical head-end, and the first slot is a slot allocated by the optical head-end to obtained periodic data. The transceiver module 1402 is further configured to send a serial number (SN) discovery response message or a ranging response message to the optical head-end in the second slot.

For more detailed descriptions of the processing module 1401 and the transceiver module 1402, refer to the related descriptions in the method embodiment shown in FIG. 5. Details are not described herein again.

It should be understood that in this embodiment of this application, the processing module 1401 may be implemented by a processor or a processor-related circuit component, and the transceiver module 1402 may be implemented by a transceiver or a transceiver-related circuit component.

Based on the foregoing content and a same concept, as shown in FIG. 15, this application further provides a communication apparatus 1500. The communication apparatus 1500 may include a processor 1501 and a transceiver 1502. The processor 1501 and the transceiver 1502 are coupled to each other. It may be understood that the transceiver 1502 may be an interface circuit or an input/output interface. Optionally, the communication apparatus 1500 may further include a memory 1503, configured to store instructions executed by the processor 1501, store input data required by the processor 1501 to run the instructions, or store data generated after the processor 1501 runs the instructions.

When the communication apparatus 1500 is configured to implement the method shown in FIG. 5, the processor 1501 is configured to perform a function of the foregoing processing module 1401, and the transceiver 1502 is configured to perform a function of the foregoing transceiver module 1402.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner or may be implemented in a manner of executing software instructions by a processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, the storage medium is coupled to the processor, so that the processor can read information from the storage medium and write information into the storage medium. Certainly, the storage medium may alternatively be a component of the processor. The processor and the storage medium may be located in the ASIC. In addition, the ASIC may be located in an optical head-end or an optical terminal. Certainly, the processor and the storage medium may alternatively exist in the optical head-end or the optical terminal as discrete components.

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer programs or instructions. When the computer program or the instructions are loaded and executed on a computer, all or a part of procedures or functions in embodiments of this application are performed. The computer may be a general-purpose computer, a dedicated computer, a computer network, an optical head-end, an optical terminal, user equipment, or another programmable apparatus. The computer program or the instructions may be stored in a computer-readable storage medium, or may be transmitted from a computer-readable storage medium to another computer-readable storage medium. For example, the computer program or the instructions may be transmitted from a website, computer, server, or data center to another website, computer, server, or data center in a wired or wireless manner. The computer-readable storage medium may be any usable medium accessible by the computer, or a data storage device, like a server or a data center, integrating one or more usable media. The usable medium may be a magnetic medium, for example, a floppy disk, a hard disk, or a magnetic tape. Alternatively, the usable medium may be an optical medium, for example, a digital video disc (DVD). Alternatively, the usable medium may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "and/or" describes an association relationship between associated objects, and represents that three relationships may exist. For example, A and/or B may represent: Only A exists, both A and B exist, and only B exists. A and B may be singular or plural. In the text descriptions of this application, the character "/" generally represents an "or" relationship between associated objects. In the formula of this application, the character "/" represents a "division" relationship between associated objects. In addition, in this application, the term "for example" is used to represent giving an example, an illustration, or a description. Any embodiment or design scheme described as an "example" in this application should not be explained as being more preferred or having more advantages than another embodiment or design scheme. Alternatively, it may be understood as that the word "example" is used to present a concept in a specific manner, and does not constitute a limitation on this application.

It may be understood that various numbers in embodiments of this application are merely used for differentiation for ease of description, and are not used to limit the scope of embodiments of this application. The serial numbers of the foregoing processes do not mean execution sequences, and the execution sequences of the processes should be determined based on functions and internal logic of the processes. The terms "first", "second", and the like are used to distinguish between similar objects, but do not necessarily indicate a specific order or sequence. In addition, the terms "include", "have", and any variant thereof are intended to cover non-exclusive inclusion, for example, include a series of steps or modules. Methods, systems, products, or devices are not necessarily limited to those steps or modules that are expressly listed, but may include other steps or modules that are not expressly listed or that are inherent to such processes, methods, products, or devices.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A method, comprising:
   obtaining, by an optical head-end, a data amount of periodic data and a cycle period; and
   allocating, by the optical head-end, a first slot and a second slot based on the cycle period and the data amount of the periodic data, wherein the first slot is used to transmit the periodic data, the second slot is used for windowing, and the second slot is a part or all of slots other than the first slot in the cycle period.

2. The method according to claim 1, wherein the second slot is located after the first slot, the second slot is located before the first slot, or the second slot and the first slot are alternately distributed.

3. The method according to claim 1,
   wherein the second slot is less than one frame of a passive optical network (PON) system to which the optical head-end belongs, or
   wherein the second slot is equal to an integer multiple of the one frame of the PON system to which the optical head-end belongs.

4. The method according to claim 1, wherein the obtaining, by the optical head-end, the data amount of the periodic data and the cycle period comprises:
   receiving, by the optical head-end, the cycle period and the data amount of the periodic data from a programmable logic controller (PLC).

5. The method according to claim 1, wherein the method further comprises:
   sending, by the optical head-end, first information to an optical terminal, the first information notifying the optical terminal of the second slot used for windowing.

6. The method according to claim 5, wherein the method further comprises:
   receiving, by the optical head-end, a serial number (SN) discovery response message or a ranging response message sent by the optical terminal in the second slot.

7. The method according to claim 5, wherein the optical terminal is an off-line optical terminal.

8. The method according to claim 1, wherein the windowing comprises ranging windowing or SN discovery windowing.

9. The method according to claim 1, wherein the allocating, by the optical head-end, the first slot and the second slot based on the cycle period and the data amount of the periodic data comprises:
   obtaining, by the optical head-end, an uplink rate of an optical terminal;
   determining, by the optical head-end, a ratio of the data amount of the periodic data to the uplink rate as a first size of the first slot;
   determining, by the optical head-end, the part or all of the cycle period except for the first size of the first slot as a second size of the second slot; and
   determining, by the optical head-end, a first location of the first slot and a second location of the second slot.

10. A method, comprising:
    receiving, by an optical terminal, first information from an optical head-end, wherein the optical terminal is an off-line optical terminal;
    determining, by the optical terminal based on the first information, a second slot used for windowing, wherein the second slot is a part or all of slots other than a first slot in a cycle period obtained by the optical head-end, and the first slot is a slot allocated by the optical head-end to obtain periodic data; and
    sending, by the optical terminal, a serial number (SN) discovery response message or a ranging response message to the optical head-end in the second slot.

11. The method according to claim 10, wherein the windowing comprises ranging windowing or SN discovery windowing.

12. An apparatus, comprising:
at least one processor; and
a non-transitory computer readable storage medium storing instructions that, when executed by the at least one processor, cause the apparatus to perform operations including:
obtaining a data amount of periodic data and a cycle period; and
allocating a first slot and a second slot based on the data amount of the periodic data and the cycle period, wherein the first slot is used to transmit the periodic data, the second slot is used for windowing, and the second slot is a part or all of slots other than the first slot in the cycle period.

13. The apparatus according to claim 12, wherein the second slot is located after the first slot, the second slot is located before the first slot, or the second slot and the first slot are alternately distributed.

14. The apparatus according to claim 12,
wherein the second slot is less than one frame of a passive optical network (PON) system to which the apparatus belongs, or
wherein the second slot is equal to an integer multiple of the one frame of the PON system to which the apparatus belongs.

15. The apparatus according to claim 12, wherein the obtaining the data amount of the periodic data and the cycle period comprises:
receiving the cycle period and the data amount of the periodic data from a programmable logic controller (PLC).

16. The apparatus according to claim 12, wherein the operations further comprise:
sending first information to an optical terminal, the first information notifying the optical terminal of the second slot used for windowing.

17. The apparatus according to claim 16, wherein the operations further comprise:
receiving a serial number (SN) discovery response message or a ranging response message sent by the optical terminal in the second slot.

18. The apparatus according to claim 16, wherein the optical terminal is an off-line optical terminal.

19. The apparatus according to claim 12, wherein the windowing comprises ranging windowing or SN discovery windowing.

20. The apparatus according to claim 12, wherein the allocating the first slot and the second slot based on the cycle period and the data amount of the periodic data comprises:
obtaining an uplink rate of an optical terminal;
determining a ratio of the data amount of the periodic data to the uplink rate as a first size of the first slot;
determining the part or all of the cycle period except for the first size of the first slot as a second size of the second slot; and
determining a first location of the first slot and a second location of the second slot.

* * * * *